US009390752B1

United States Patent
McNeill et al.

(10) Patent No.: US 9,390,752 B1
(45) Date of Patent: Jul. 12, 2016

(54) MULTI-CHANNEL VIDEO EDITING

(75) Inventors: Stephen McNeill, St. Lazare (CA);
Shailendra Mathur, Beaconsfield (CA);
Michel Eid, Ville Mont-Royal (CA);
Sylvain Girard, Montreal (CA)

(73) Assignee: Avid Technology, Inc., Burlington, MA (US)

( * ) Notice: Subject to any disclaimer, the term of this patent is extended or adjusted under 35 U.S.C. 154(b) by 64 days.

(21) Appl. No.: 13/293,381

(22) Filed: Nov. 10, 2011

Related U.S. Application Data

(60) Provisional application No. 61/531,163, filed on Sep. 6, 2011.

(51) Int. Cl.
*G11B 27/022* (2006.01)
*G06T 3/40* (2006.01)
*G06T 19/20* (2011.01)

(52) U.S. Cl.
CPC ............. *G11B 27/022* (2013.01); *G06T 3/40* (2013.01); *G06T 19/20* (2013.01)

(58) Field of Classification Search
CPC ......... G11B 27/022; G06T 3/40; G06T 19/20
USPC ........................................................ 715/719
See application file for complete search history.

(56) References Cited

U.S. PATENT DOCUMENTS

| | | | |
|---|---|---|---|
| 5,267,351 A | 11/1993 | Reber et al. | |
| 5,355,450 A | 10/1994 | Garmon et al. | |
| 5,745,126 A * | 4/1998 | Jain et al. | 382/154 |
| 6,097,394 A * | 8/2000 | Levoy et al. | 345/419 |
| 6,115,717 A * | 9/2000 | Mehrotra et al. | |
| 6,141,145 A * | 10/2000 | Nalwa | 359/403 |
| 6,332,119 B1 * | 12/2001 | Hinderks | 704/206 |
| 6,754,384 B1 * | 6/2004 | Spaulding | H04N 1/6058 345/590 |
| 7,142,209 B2 * | 11/2006 | Uyttendaele et al. | 345/427 |
| 7,286,143 B2 * | 10/2007 | Kang et al. | 345/629 |
| 7,292,257 B2 * | 11/2007 | Kang et al. | 345/629 |

(Continued)

OTHER PUBLICATIONS

Lisa Purse, "The New Spatial Dynamics of the Bullet-Time Effect", 2005, Intellect Books, published in "The Spectacle of the Real: From Hollywood to 'Reality' TV and Beyond", edited by Geoff King, pp. 151-160.*

(Continued)

*Primary Examiner* — Patrick Riegler
*Assistant Examiner* — Nicholas Klicos
(74) *Attorney, Agent, or Firm* — Oliver Strimpel

(57) ABSTRACT

Methods and systems for constructing media output by combining multiple input media channels corresponding to different views of a scene. The construction involves combining channels that have different spatial ranges and/or color ranges so as to produce a constructed output having a range that is a composite of input channel spatial and/or color ranges. The constructed output is generated dynamically from available input channels in response to output requirements specifying a view defined in part by spatial and/or color parameter ranges. Available input channels are represented by a single multi-channel source object comprising a hierarchy of grouped and aligned channels, with individual media essence files at the lowest level. Input channel ranges and relationships among the ranges are specified by metadata associated with each channel. During editing, input channels may be added, removed, or changed and the range and nature of the constructed media output are updated dynamically.

28 Claims, 6 Drawing Sheets

(56) References Cited

U.S. PATENT DOCUMENTS

| | | | | |
|---|---|---|---|---|
| 7,660,464 | B1* | 2/2010 | Peterson | G06T 5/50 382/181 |
| 7,823,058 | B2* | 10/2010 | Pea et al. | 715/230 |
| 2002/0012054 | A1* | 1/2002 | Osamato | 348/273 |
| 2003/0113035 | A1* | 6/2003 | Cahill | G06T 3/00 382/284 |
| 2005/0219264 | A1* | 10/2005 | Shum | G06T 15/205 345/629 |
| 2006/0158462 | A1* | 7/2006 | Toyama et al. | 345/629 |
| 2006/0177150 | A1* | 8/2006 | Uyttendaele et al. | 382/284 |
| 2006/0244907 | A1* | 11/2006 | Simmons | 351/162 |
| 2007/0274563 | A1* | 11/2007 | Jung et al. | 382/103 |
| 2008/0043108 | A1* | 2/2008 | Jung et al. | 348/207.1 |
| 2008/0044081 | A1* | 2/2008 | Lieb | 382/162 |
| 2008/0046409 | A1* | 2/2008 | Lieb | 707/3 |
| 2008/0178087 | A1* | 7/2008 | Fitzgibbon et al. | 715/723 |
| 2009/0021513 | A1* | 1/2009 | Joshi et al. | 345/419 |
| 2009/0128568 | A1* | 5/2009 | Gloudemans et al. | 345/474 |
| 2009/0153576 | A1* | 6/2009 | Keller | 345/581 |
| 2009/0262184 | A1* | 10/2009 | Engle et al. | 348/47 |
| 2009/0315978 | A1* | 12/2009 | Wurmlin et al. | 348/43 |
| 2009/0317017 | A1* | 12/2009 | Au et al. | 382/274 |
| 2009/0322800 | A1* | 12/2009 | Atkins | 345/690 |
| 2009/0326383 | A1* | 12/2009 | Barnes et al. | 600/476 |
| 2010/0080448 | A1* | 4/2010 | Tam et al. | 382/154 |
| 2010/0128121 | A1* | 5/2010 | Wilkinson | 348/135 |
| 2010/0157154 | A1* | 6/2010 | Kobayashi | G09G 5/397 348/557 |
| 2010/0158471 | A1* | 6/2010 | Ogikubo | G06F 3/04845 386/278 |
| 2010/0165077 | A1* | 7/2010 | Yin et al. | 348/42 |
| 2010/0177160 | A1* | 7/2010 | Tocher et al. | 348/36 |
| 2010/0183280 | A1* | 7/2010 | Beauregard et al. | 386/54 |
| 2010/0253685 | A1* | 10/2010 | Segasby et al. | 345/426 |
| 2010/0318914 | A1* | 12/2010 | Zitnick et al. | 715/719 |
| 2011/0032329 | A1* | 2/2011 | Bauza et al. | 348/43 |
| 2011/0050864 | A1* | 3/2011 | Bond | 348/51 |
| 2011/0072349 | A1* | 3/2011 | Catanese et al. | 715/719 |
| 2011/0128353 | A1* | 6/2011 | Leung et al. | 348/47 |
| 2011/0129148 | A1* | 6/2011 | Kisilev et al. | 382/167 |
| 2012/0033872 | A1* | 2/2012 | Cho | H04N 13/0011 382/154 |
| 2012/0120200 | A1* | 5/2012 | Newton | H04N 13/0003 348/46 |
| 2012/0201475 | A1* | 8/2012 | Carmel et al. | 382/238 |
| 2013/0108183 | A1* | 5/2013 | Bruls | G06T 9/004 382/233 |
| 2013/0121569 | A1* | 5/2013 | Yadav | G06T 5/50 382/164 |
| 2013/0124471 | A1* | 5/2013 | Chen et al. | 707/624 |

OTHER PUBLICATIONS

Sun et al., "Region of Interest Extraction and Virtual Camera Control Based on Panoramic Video Capturing", Oct. 2005, IEEE Transactions on Multimedia, pp. 981-990.*

Wikipedia, "Matte (filmmaking)", accessed Mar. 18, 2013 from <http://en.wikipedia.org/wiki/Matte_(filmmaking)>.*

Wikipedia, "Auditory masking", accessed Mar. 18, 2013 from <http://en.wikipedia.org/wiki/Auditory_masking>.*

Wikipedia, "Ancillary data", accessed Mar. 18, 2013 from <http://en.wikipedia.org/wiki/Ancillary_data>.*

Fattal et al., "Gradient Domain High Dynamic Range Compression", 2002, ACM, Inc., pp. 249-256.*

Gortler et al., "Rendering Techniques 2001", 2001, Springer-Verlag Wien, pp. 1-361.*

Ward et al., "High Dynamic Range Imaging & Image-based Lighting", 2008, SIGGRAPH, pp. 1-137.*

Kopf et al., "Capturing and Viewing Gigapixel Images", Jul. 2007, ACM Transactions on Graphics, vol. 26, No. 3, pp. 93-1 to 93-10.*

Ward et al., "Subband Encoding of High Dynamic Range Imagery", 2004, ACM, Inc., pp. 1-9.*

Adelson, E.H. et al,, "The plenoptic function and the elements of early vision", In Computation Models of Visual Processing, MIT Press, Cambridge, 1991, pp. 3-20.

Debevec, P.E., et al., "Recovering High Dynamic Range Radiance Maps from Photographs", SIGGRAPH 1997, pp. 369-378.

Georgiev, T., et al., "High Dynamic Range Image Capute with Plenoptic 2.0 Camera", Signal Recovery and Synthesis (SRS), Fall OSA Optics & Photonics Congress, 2009.

Gortler, S.J., et al., "The Lumigraph", SIGGRAPH 1996, pp. 43-54.

Horn, D., et al., "LightShop: Interactive Light Field Manipulation and Rendering", Proc. 2007 Symposium on Interactive 3D Graphics, pp. 121-128.

Levoy, M., et al., "Light Field Rendering", SIGGRAPH 1996, pp. 31-42.

Lumsdaine, A., et al., "The focused plenoptic camera", In Proc. IEEE ICCP 2009, pp. 108.

Ng, L., et el,, "Light Field Photography with a Hand-Held Plenoptic Camera, Stanford Computer Science" Technical Report CSTR Feb. 2005, Apr. 2005.

Shum, H.Y., "A Review of Image-Based Rendering Techniques", IEEE/SPIE Visual Communications and Image Processing (VCIP) 2000, pp. 2-13.

Shum, H.Y., "Pop-up light field: An interactive image-based modeling and rendering system", In Proceedings of Transactions on Graphics, 2004, pp. 143-162.

Watkin, K,L., et al., "Three-Dimensional Reconstruction and Enhancement of Freely Acquired 2D Medical Ultrasonic Images", Can Conf. on Electrical and Computer Engineering, Proceedings 1993, pp. 1188-1195, abstract only.

Wilburn, B., et al., "High Perfomance Imaging Using Large Camera Arrays", ACM Trans. Graph. 24, 3, 2005, pp. 765-776.

Yang, J., et al., "A Real-Time Distributed Light Field Camera", Thirteenth Eurographic Workshop on Rendering 2002, pp. 77-85.

Grau, Oliver, at al., "Stereoscopic 3D sports content without stereo rigs", British Broadcsting Corporation, Research White Paper, WHP 180, Nov. 2009, pp. 1-6.

Zhang, Z., et al., "Feature-based light field morphing", In Proceedings of Transations on Graphics, SIGGRAPH 2002, pp. 457-464.

* cited by examiner

MULTI-CHANNEL VIDEO EDITING

CROSS-REFERENCE TO RELATED APPLICATION

This application claims the benefit of and priority under 35 U.S.C. §119(e) to U.S. provisional patent application Ser. No. 61/531,163, filed Sep. 6, 2011, and entitled "Multi-Channel Video Editing", the contents of which is incorporated herein by reference.

BACKGROUND

Resurgent interest in stereo 3D video has fuelled a more general interest in media generated from a combination of sources rather than from a single video source. While the simplest form of stereo 3D capture involves two cameras on a stereo rig or a dual-lens camera, with one view corresponding to a left eye view and the other to a right eye view, the use of additional cameras, such as wing or witness cameras and depth-capture cameras, is increasingly common. Such additional cameras capture a scene from additional viewpoints, providing additional spatial information about a scene. One use of such additional cameras is to supply information that might be missing as a result of occlusion of edge effects when generating stereo 3D output.

In addition to spatial information, different kinds of perceptual information about the same scene can be captured to provide an editor with more media resources for the post-production phase. Such additional information may include an expanded intensity (color) dynamic range, different depth of field ranges, and depth data.

Expanded scene information may be obtained from a single device that captures various kinds of information. Another type of single device may capture expanded ranges of particular types of perceptual information from which specific ranges of information can be extracted later. Alternatively, expanded scene information may be captured via multiple devices, each providing a certain type and/or range of scene information. In all cases, such scene information sources are referred to herein as multi-view sources.

In order to work effectively with multi-view sources, data management and editing functions that are able to handle these sources are needed in post-production and asset management systems. Common data management and editing tasks include copying, cutting, compositing, splicing, deleting, consolidating (identifying media that is used in a sequence), and archiving media that originates from the sources.

The information obtained from multiple camera viewpoints may be used for image-based rendering, in which the various viewpoints are used to generate a 3D geometric model of a scene from which novel views can be synthesized. This can be especially useful when new camera viewing angles of a background scene are needed for compositing virtual or green-screen subjects.

Another use of multiple viewpoints of a scene is to stitch the individual images together to produce high resolution, wide field of view imagery that can be resampled later at a lower resolution or used to extract a partial view. A further application of cameras providing imagery of a given scene from multiple viewpoints is to provide viewers with a choice of views. This can be especially desirable when watching a sports game to offer a choice of long shots, close-ups, and different angles of a game. The OB1 system from the Hego Group of Stockholm, Sweden, is an example of such a live broadcast system.

Plenoptic cameras may be used as a multi-view source that captures four-dimensional light field information about a scene. Examples of plenoptic cameras include the Adobe® Light Field Camera under development by Adobe, Inc., of San Jose, Calif., and the Lytro Light Field Camera announced by Lytro, Inc., of Mountain View, Calif. With such information, the focus range desired can be chosen after data is captured, which allows the reconstruction of arbitrary views using different depth of field ranges.

In medical imaging, sampling a volumetric three-dimensional region of the human body followed by viewing of arbitrary two-dimensional image samples in arbitrary positions and orientations is common in CAT, MRI, and Ultrasound imaging. In addition, various ultrasound views from arbitrary positions and orientations have been resampled into a regular voxel based three-dimensional volumetric image. A volumetric three-dimensional image may be viewed as an example of a light field. In such systems the use of arbitrary views to create a three-dimensional volumetric image requires rich relative position and orientation data, which contrasts with the regular planar sampling deployed by CAT and MRI medical images.

Along a different imaging domain, multi-view sources can also capture scenes with multiple ranges of color exposure values. Such imagery can be combined to create high dynamic range (HDR) imagery. Such sources may be implemented as a multi-camera rig that holds several cameras, each capturing a different intensity range, or by sequential capture of range subsets by a single camera. Other camera systems are able to capture a single, wide range of color exposures using a single device. Such cameras include the Epic® camera from Red Digital Cinema Camera Company of Lake Forest, Calif., and the Alexa camera from Arnold & Richter Cine Technik (ARRI) of Munich, Germany. Another source of HDR images can be products such as Adobe Photoshop® which can be used to merge multiple input images files together to create a single output HDR image file.

In multi-camera setups, or multi-cam, film making or video production utilizes multiple cameras systems capturing the same scene. These cameras are synchronized using the same time reference to ensure that the metadata recorded as part of the captured media from each camera corresponds to a common timecode. Various tools exist to help editors work with these multi-camera sources within the context of non-linear media editing systems, such as Media Composer® from Avid Technology, Inc. of Burlington, Mass., described in part in U.S. Pat. Nos. 5,267,351 and 5,355,450, which are incorporated by reference herein, and Final Cut Pro® from Apple Computer, Inc. of Cupertino Calif. For example, the Multi-Cam, Auto-Sync, and Group Clips tools, which are features of Media Composer, facilitate the management and editing of multiple channel sources. The grouped clip tool uses metadata information to identify the clips that arise from a common scene. The sync-clip editing functions use the temporal metadata associated with the channels to align the clips with respect to each other in the time reference of the editor's timeline view. The Multi-cam takes input channels chosen by the user to provide a single time multiplexed output for a requested time span. The grouping of the temporally aligned clips also allows the editor to perform edits such as trimming and cuts on a clip group. Data management functions such as optimized deletion, consolidation, and archiving can also be performed by identifying the used spans of the various channels in the clip group, and preserving those segments, while leaving the unused portions available for deletion.

As a result of the increasing number of capture devices used to sample a scene, and the amount of perceptual information being captured by these devices, the task of managing and editing a video segment that makes use of some or all of the sources of media becomes increasingly challenging. Tools that handle relationships among the sources, and assist editors in managing, combining, and editing using metadata and multi-channel sources are needed.

SUMMARY

In general, the methods, systems, and computer program products described herein enable editors to manage and edit multiple channel sources that have at least one of a spatial, intensity, or color relationship to each other. The input channels are combined dynamically to produce one or more output channels that meet a specified set of output requirements.

In general, a method of editing a multi-channel media composition includes: receiving an indication of a plurality of input channels, wherein each of the input channels corresponds to a different input view of a scene, wherein a given input channel includes metadata that defines an input view to which it corresponds, the metadata including value ranges of a plurality of parameter types, wherein the plurality of parameter types includes at least one of a spatial parameter type and a color parameter type; using metadata included within the plurality of input channels to group and align the plurality of input channels into a single synthetic light field source object; and providing a graphical user interface for a multi-channel media editing system to enable a user of the multi-channel media editing system to define an output view for the multi-channel media composition, wherein the output view is defined in part by output ranges of values of the plurality of parameters, wherein the output ranges include values of at least one of a spatial parameter and a color parameter that span a plurality of input channels.

Various embodiments include one or more of the following features. The plurality of parameters further includes a temporal parameter type. Providing one or more media data streams, each of the one or more media data streams comprising media data representing an input view of one of the plurality of input channels, and linking each of the one or more media data streams to an input channel corresponding to the input view represented by the media data stream. The one or more media data streams include media data representing a subset of the output ranges of the plurality of parameters, and displaying in a window of the graphical user interface media data from the one or media data streams. The one or more media data streams comprise a plurality of media data streams, wherein at least two of the plurality of media data streams comprise media data representing a given one of the input views at different resolutions, and wherein an input channel corresponding to the given one of the input views is linked to both of the at least two of the plurality of media data streams. The one or more media data streams includes a media data stream representing a given one of the input views at a first resolution, and enabling the user to view the media data stream at the first resolution and to define an output view that includes at least a portion of the given one of the input views, requesting a media data stream corresponding to the included portion of the input view at a second resolution, receiving the media data stream corresponding to the included portion of the input view at the second resolution, and linking the input channel corresponding to the given one of the input views to the received media data stream at the second resolution. The media data stream at the first resolution corresponds to a frame-compatible format of a stereoscopic output view, and the media data stream at the second resolution corresponds to a full frame version of each of a left eye and a right eye view of the stereoscopic output view. The media data stream at the first resolution corresponds to media data at a first sampling granularity and the second resolution corresponds to media data at a second sampling granularity. The media data stream at the first resolution corresponds to media data having a first compression type and the media data at the second resolution corresponds to media data having a second compression type. The output view is defined in part by an output resolution. The output ranges of values of the plurality of parameters include values corresponding to an unpopulated input channel that is not represented by the one or more media data streams. Receiving additional media data corresponding to the unpopulated input channel, linking the unpopulated input channel to the additional media data, and enabling the user to view the additional media data in a display of the multi-channel media editing system. After enabling a user to define an output view, receiving an indication of an additional channel corresponding to an additional input view, grouping and aligning the additional channel with the synthetic light field source object using metadata referenced by the additional channel, and updating the graphical user interface to enable the user to define an output view having parameter value ranges that include parameter value ranges of the additional input view. The output ranges include values corresponding to a spatial parameter, and enabling the user to specify the output spatial parameter range using a spatial range user interface feature of the video composition system. The output ranges include values corresponding to a color parameter, and enabling the user to specify the output color parameter range using a color range user interface feature of the multi-channel media composition system. Enabling the user to define a second output view of the scene, wherein the second output view is defined in part by second output ranges of values of the plurality of parameters. The first-mentioned and second output views correspond to a left eye view and right eye view respectively of a stereoscopic output view of the scene. The video composition system includes a display window for displaying a representation of a current state of the video composition system, and the video composition system enables the user to view a selected one of the left eye view and the right eye view in the display window. At least one of the first mentioned and the second output views include a view constructed from a plurality of the input channels. Receiving an indication of one or more additional input channels representing additional media streams that are not to be aligned. The additional media streams include at least one of ancillary data, an audio mask, and a matte. Determining a set of required ranges of values of parameters defining the input views for the input channels that are required to generate the output view and consolidating one or more media data streams representing the input views to retain portions of the media data streams corresponding to the set of required ranges of values and to enable portions of the media data streams not corresponding to the set of required ranges of values to be deleted. The multi-channel media composition is a video composition, a still image composition, or a light field image. The multi-channel media composition comprises computer generated media.

In general, in another aspect, a computer program product comprises a computer-readable medium with computer program instructions encoded thereon, wherein the computer program instructions, when processed by a computer, instruct the computer to perform a method for multi-channel media composition, the method comprising: receiving an indication of a plurality of input channels, wherein each of the input channels corresponds to a different input view of a scene, wherein a given input channel includes metadata that defines an input view to which it corresponds, the metadata including value ranges of a plurality of parameter types, wherein the plurality of parameter types includes at least one of a spatial parameter type and a color parameter type; using metadata included within the plurality of input channels to group and align the plurality of input channels into a single synthetic light field source object; and providing a graphical user interface for a multi-channel media editing system to enable a user of the multi-channel media editing system to define an output view for the multi-channel media composition, wherein the output view is defined in part by output ranges of values of the plurality of parameters, wherein the output ranges include values of at least one of a spatial parameter and a color parameter that span a plurality of input channels. Various embodiments include computer program products having one or more of the features described in the third paragraph of this section.

In general, in a further aspect, a computer system for multi-channel media composition comprises a processor programmed to: receive an indication of a plurality of input channels, wherein each of the input channels corresponds to a different input view of a scene, wherein a given input channel includes metadata that defines an input view to which it corresponds, the metadata including value ranges of a plurality of parameter types, wherein the plurality of parameter types includes at least one of a spatial parameter type and a color parameter type; use metadata included within the plurality of input channels to group and align the plurality of input channels into a single synthetic light field source object; and provide a graphical user interface for a multi-channel media editing system to enable a user of the multi-channel media editing system to define an output view for the multi-channel media composition, wherein the output view is defined in part by output ranges of values of the plurality of parameters, wherein the output ranges include values of at least one of a spatial parameter and a color parameter that span a plurality of input channels. Various embodiments include systems having processors programmed to perform one or more of the features described in the third paragraph of this section.

DETAILED DESCRIPTION

Figure 1:
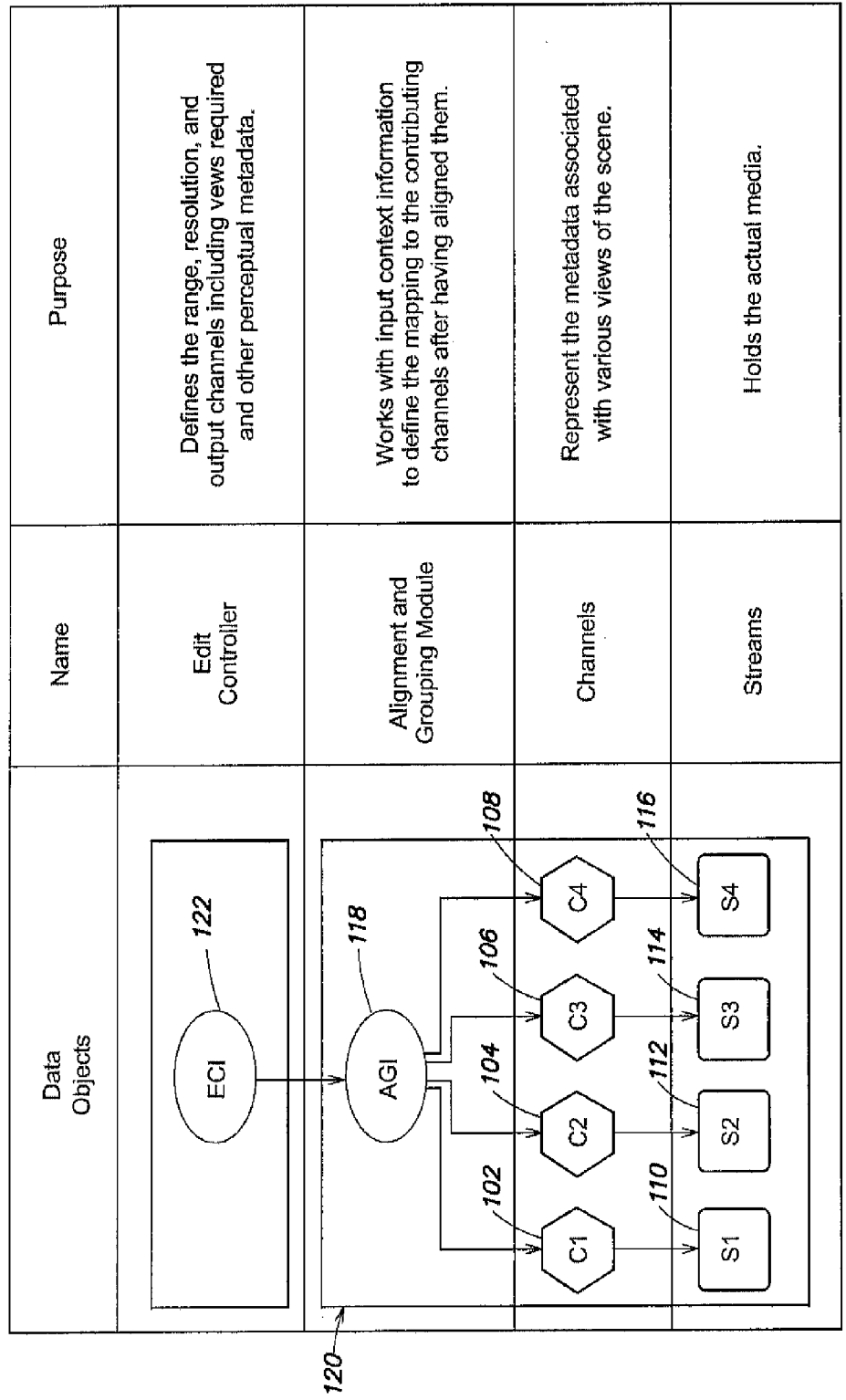
FIG. 1 illustrates an example of compositional relationships for a multi-channel grouping of four views of a scene into a synthetic light field source for an editing and data management system.

We describe herein methods and systems for managing source media channels that include not only temporal relationships, but also spatial, color, and intensity relationships. We first define terms and nomenclature as used herein.

A "scene" is volume of physical or virtual (e.g., computer generated) space in which spatially located objects provide radiance values over a range of time. The physical sensor, camera, storage or transport medium that serves as the originator of the digital media as used by a post production or asset management system is referred to as a "source."

A light field has traditionally been defined as a function describing the amount of radiance along rays in empty space. A ray can be parameterized in four or five-dimensional form with the dimensions providing the spatial location of a unique ray. The number and arrangement of images in a light field, and the resolution of each image, are together called the "sampling" of the four-dimensional light field. While light field sampling covers the sampling of various spatial locations of a scene, also included herein is the sampling of other perceptual information that can be captured from a scene, including temporal and color domains. For lens-based sources, the focal length domain is also considered. To incorporate the information in these other domains, we extend the concept of the light field to incorporate sampling over these additional domains, and refer to such an extended light field as the "perceptual light field." The perceptual light field is a fuller sampling of a scene than the traditional light field, since it includes additional domains.

A "view" is the data representing only part of a scene, where the type of data captured is dependent on the parameters and capabilities of the sensor. An example of a sensor that provides one view of a scene is a camera at a particular position and orientation that is capable of capturing a segment over a period of time limited by the storage disk capacity. A view may also be limited to a dynamic range and cromaticity range defined by the CCD capabilities, and may also be defined by a particular focus and aperture setting.

The term "channel" refers to an entity containing metadata that references scene data from a particular view. Individual channels contain metadata that defines scene data in the spatial, color, temporal and/or focal length domains sampled at a specified resolution for a prescribed range of values within a normalized coordinate system representing the scene. In addition, raster channels may include metadata representing other kinds of information about a scene, such as mattes, masks, depth-masks for a corresponding video channel, disparity data between some of the video channels, and ancillary data. Such additional information is not necessarily part of the light field, but needs to be managed together with the rest of the media streams for the scene. The digital information containing the spatial, temporal and color sample values for the channel is stored in a "stream." The digital information packing within the stream is typically dependent on the type of source that captured the media data and the transport mechanism used to transfer the information from the source to the editing system. Examples of streams include a file containing digital information corresponding to a single channel, a file containing digital information corresponding to multiple channels, or a network port or a port on a hardware I/O card providing streamed packets of digital information.

A given channel may have more than one stream associated with it. Different versions of the same channel may represent different "resolutions," which may refer to streams of different sampling granularity, different methods of information packaging, or different compression type. Examples of sampling granularity may be the different number of pixels for a given output aspect ratio, e.g., 1920×1080 versus 1440×1080 for the same 16:9 aspect ratio. Temporal sampling granularity may be the temporal frame rate for the same duration of media, e.g., 120 fps, 60p, or 59.94i. In color sampling, the granularity may be the bit-depth for the same color gamut and lightness ranges, e.g., 8, 10, 12, 16 or 32 bits per color channel. Examples of different information packaging type or sampling pattern for the same range may be 4:2:2 versus 4:4:4 color subsampling, or the color space used to represent that data, e.g., RGB or YCbCr. Temporal packaging may include field versus segmented frames. While the granularity and sampling pattern also offer advantages of compressing the data in the media stream, there are also various compression algorithms that provide different resolutions for the same view. For example, the same view provides different levels of compression when encoded with an MPEG-2 standard versus an MPEG-4 standard.

When a single source is able to provide multiple views of the same scene, the single source is referred to as a "dynamic-view source." An example of a dynamic view source is a computer-generated (CG) scene used as a source in an editing system coupled to software that generates the required views on demand.

When multiple channels representing different views of a scene are obtained, the channels are associated with "relational metadata." This metadata defines the relationship between the various samples of the light field, and may be in a relative form, i.e., representing relationships among the samples, or in an absolute form using a common reference origin in the scene. Key information contained explicitly (in defined units) or implicitly (using known labels) in the relational metadata are the range and resolution of the channel information.

The term "spatial metadata" refers to camera metadata and other image-related data that allow spatial alignment between spatial samples. In its simplest form, it may be the relative position of the cameras with respect to each other, such as the distance between the left and the right camera on a rig (relative form) or the distance and orientation of the camera with respect to a common reference origin (absolute form). Another form of relative implicit spatial metadata may be the identification of a camera as "Left" or "Right" in a stereo rig, or attributes specifying whether the images have been inverted horizontally or vertically by a mirror. As used herein, the term "alignment" refers to temporal alignment (often referred to as synchronization), spatial alignment (also known as registration), and color alignment (corresponding to tone mapping). Thus one or more of these processes is meant by the term, depending on the data type(s) being aligned.

The term "color metadata" refers to quantities such as the color gamut as well as the luminance range (also commonly referred to as the dynamic range). The color values may be in device-independent scene-referred CIE XYZ color space, or be relative to a common black and white point reference in a quantized sampling within a common color model.

The term "temporal metadata" refers to data representing a time corresponding to the captured data. Temporal metadata is represented in absolute time of day seconds, ticks per second, or as a time relative to an overall duration of a sampled event.

Other metadata describing imaging device parameters are also part of relational metadata such as focal length, aperture, f-stop, field of view, look-at vector, contrast-range, and CCD sensitivity. Such metadata may provide parametric information independent of the three spatial, temporal and color domains. Focal length is one example an independent parameter. In other cases this other type of metadata act as higher level descriptors based on deriving placement, range, and resolution information within more than one perceptual domain.

To address the challenges of editing and managing the information representing the various available views, embodiments of the editing and data management system described here are presented with the multiple views of the same scene represented as a single self-contained perceptual light field. Appropriate data structures and run-time models abstract away the multiple channels and the various streams representing different views so that the perceptual light field itself appears as a new source object representing the original scene to the editing and data management system. We refer to the single object representing the scene to be managed and edited as the "synthetic light field source." The editing and data management system uses the synthetic light field source to construct one or more output views of the scene, which are represented as one or more corresponding output channels. A system used to execute the editing and data management functions on a synthetic light field source is referred to as a multi-channel video editing and data management system. Note that such a system is able to work with multiple channels, both as input and as output.

The data structure to create a synthetic light field source for the editing and data management system involves creating a data container structure that groups together all the various channels and corresponding streams. The whole data container appears to the editor and data management system as a single dynamic view source as defined above that represents a perceptual light field sampling of a scene. A run-time system executes logic on metadata associated with the media, or on the media data itself. Using the run-time system, the editing and data management system treats the data container structure as a whole as if it was a live device viewing the scene. A dynamic view source allows new views to be constructed and provided to the system in a dynamic fashion in response to requests from the editing system. The requests are parametrically described in objects called "output contexts."

A dynamic view source defined by a hierarchical relationship allows the editing and data management system to work with all the channels and corresponding media streams within the group by referring only to the root of the grouping hierarchy. The root of the hierarchy is an object defined as an "alignment and grouping module" that is instantiated by a run-time engine to execute functions that work purely with metadata. The purpose of this object is to utilize the relational metadata associated with the various channels to place the range of data contained in each channel with respect to a common reference coordinate system defined by the editing and data management system for each perceptual metadata type. As such, one purpose of the alignment and grouping module is to register, or synchronize the information in the various channels with respect to each other in the temporal, spatial, and color domains. User interfaces appropriate for each metadata type help a user visualize how the range of data contributed by each channel is positioned relative to each of the other channels of the same perceptual type.

The alignment and grouping module also provides a unified and dynamic view of all the media streams that contribute to it. For instance, whenever channels get populated by new streams, the results obtained from the alignment and grouping module reflect the newly available material. Adding new streams may, for example, extend the time span of the overall source, make new points of view accessible, or enhance the dynamic range of the output images.

The synthetic light field source may be created and used for editing and data management functions before all channels and/or streams are available. For instance, editing at the scene level may start using only the images from the left eye view of a particular scene. The group defining that scene's synthetic light field source can be updated later to add other channels, such as the right eye view or the audio content. After the update, the new media streams participate in all subsequent and/or existing edits and data management functions.

The ability to add and/or change the channels and streams contributing to a synthetic light field source makes the editing process flexible. For example, new views or new ranges of existing views may be required to make a desired edit possible and are added after the edit is performed. Some processes may occur concurrently. For example, editing may start with some of the streams while the remaining ones are being prepared. Work can also start with a lightweight proxy of the material to be later replaced with a finished version. Finally, the new streams may be condensed to include only the material required for the edit, minimizing storage needs and processing time.

To identify all the channels and corresponding streams that represent the same scene, appropriate metadata identifiers, referred to as "Group ID," are used. For the cases where the alignment and grouping module may need to populate its input channels and streams automatically, these common identifiers help the various contributors to a alignment and grouping module to be identified using an automatic scan of the metadata header information of the various streams. The Group IDs may be specified manually by the user or may be generated automatically by a camera system. Streams with the same Group ID represent sampling from different channels or different resolutions of the individual channels.

Similarly, to identify multiple streams that represent different resolutions of the same channel, a common channel metadata identifier called "Channel ID" can also used. The input views may have pre-existing identifiers such as "Source IDs" that define other relationships between the various streams and channels and serve other data management purposes.

The ability to place the input channel ranges with respect to a common reference coordinate system enables the alignment and grouping module to determine the mapping of a desired output range to the various input channels. This is performed by identifying the intersection of the output range with the synchronized input channel ranges within each perceptual metadata category. The result identifies whether a particular channel contributes to the output, and, if it does, over what range.

The alignment and grouping module may provide multiple options to pick input channels that intersect with the output range. The logic may use a mathematical function to determine range intersection areas, or it may use simple Boolean logic to select an individual contributing channel.

Since the same channel may be represented by multiple different resolutions, the same alignment and grouping module (or a different object dedicated to managing different versions of the same channel) takes the output resolution requirements into account and runs matching algorithms to identify the best pick amongst the various available streams.

As mentioned with reference to the alignment and grouping module, an output context description is required to determine the input channel ranges required, and to select the appropriate resolution. The output context includes metadata that defines the output view to be constructed, including the ranges and resolution for all the perceptual domains contained by the synthetic light field source. Since the output view may include one or more channels, the output context also contains a specification of the channels that need to be re-sampled from the perceptual light field source. Output channels may represent a different light field sampling than the contributing input channels.

For each perceptual domain, corresponding user interface elements allow editors to specify the desired output range in the common reference coordinate system. Typical examples of such editing Ms include: timeline tracks for temporal ranges; a 2D or 3D spatial viewer, together with virtual camera displays for spatial ranges; and histogram views to display the color and brightness value distribution. These user interface elements can contain widgets to define the output range such as: trim handles to change the range of a clip temporally; handles on bounding boxes or virtual camera placement manipulators that can be used to define the output spatial range; and sliders on a histogram X-axis to define the desired output range of color values. In addition to editing UIs, other user interface elements may be provided to enable editors to manipulate and define the desired output resolution of the output views. The editing UIs do not necessarily require the actual media data to be generated in order to perform editing on the ranges. It only needs the perceptual metadata. An "edit controller" object in the editing and data management system handles the UI parameters, translates them into context information for various output channels, and requests the available perceptual metadata ranges from the synthetic light field source.

As editing on the light field source is performed, new views can be constructed dynamically from the light field source for output to a device, for monitoring, for effects manipulation or for mixing/compositing with other views within a media element of a media composition. We refer to the objects that require the data for new views as "media consumers." Media consumers may provide the media data directly to the editing UI for display purposes, or may use it to analyze and extract the information in different ways to serve other forms, such as, for example, a histogram distribution of color channels in the editing UI for reference purposes. The media consumers request the new views from an object that is referred to as a "reconstruction object." To request the data, a media consumer provides the output context in terms of required ranges, resolution, channel information, and other metadata, which it obtains from the edit controller. The reconstruction objects may use other objects that contain algorithms to deal with particular perceptual data types. In general, the new views do not correspond to the individual views supplied by the various physical sources, but are constructed from the raw (input) views. In order to be able to identify what data needs to be sampled from the channels, the run-time system invokes logic in the alignment and grouping module to identify the streams, as well as the locations of the required data in the streams that intersect with the output context. This data identification may also be constrained by the data types of the output channel(s) specified in the output context. In addition the output resolution information may be used to make choices amongst the various streams. The run-time data flow is discussed below in connection with a specific example illustrated in FIG. 3.

Once the input data from the contributing channels has been collected, using similar logic to that of the alignment and grouping module, the individual input samples are transformed within each perceptual reference coordinate system, and a reconstruction object outputs values computed using filtering, interpolation or multiplexing logic using coordinate transformation functions derived from the alignment and grouping module. The specific logic or the signal processing algorithms that reconstruct and manipulate the data are not the focus here. We are principally concerned with the ability to host run-time objects associated with the editing and data management system that can execute view reconstruction algorithms. To synthesize the output view from the contributing channels, the run-time system hosts signal processing plug-ins that are capable of filtering and interpolating new views based on the ranges of information provided from each channel to reconstruct the output view desired. The algorithms may include simple multiplexing algorithms that, in some cases, simply select a particular channel over another. For example, one such algorithm picks a left eye signal over of the right eye for an output of a grouped multi-channel clip, such as a stereoscopic pair clip.

It is possible to construct an intermediate buffer containing a full reconstructed data representation that stitches together the various samples into single perceptual light field representation. However, since the required output views change dynamically during editing, the system preferably avoids reconstructing a full representation. Instead, it uses the relationships between the views as well as run-time reconstruction objects to provide the reconstructed output view dynamically. This dynamic method does not preclude the caching of various reconstructions related to the requested output context.

The run-time system and the whole data model container operate dynamically in response to output requirements specified by the user to generate the requested output view(s). Until the post-production editing phase for a project is complete, all the channel and stream data are maintained in original form so that any output view that the input channel data is capable of generating can be constructed, thereby maintaining maximum flexibility for the editor. The original synthetic light field source can be copied or archived keeping all the information intact. However, once editing of the scene is finished, users may choose to optimize storage space usage and reduce the amount of data maintained by retaining only the data that is used in an edited scene. The mapping from the output ranges back to the input channel ranges by the alignment and grouping module enables the individual channels that contribute to the output to be identified. If there are channels that do not contribute to the output, an asset management or editing system may perform operations such as consolidation or deletion of full streams or of portions of the streams that are not used for the requested views of a sequence. Similarly, when copying or archiving the edited material, only the used portions of the streams need to be identified and copied or archived.

We now describe examples of multi-channel editing and data management using the methods and systems described herein. FIG. 1 shows alignment and grouping module 118 that has four channels 102, 104, 106, 108 representing four different views of a scene, with the corresponding media data stored in respective media streams 110, 112, 114, 116. Full data container 120 is a conceptual representation of a single synthetic light field source as it appears to the editing system. The editing system itself uses edit controller 122 as a data object to work with the parameters specified by the editing user interfaces, and to construct the context information that it passes to the synthetic light field source to obtain the perceptual metadata ranges required for the output. The channel objects hold the relational metadata for each of the perceptual domains for which the associated streams have data. The relational metadata is utilized by alignment and grouping module 118.

Figure 2:
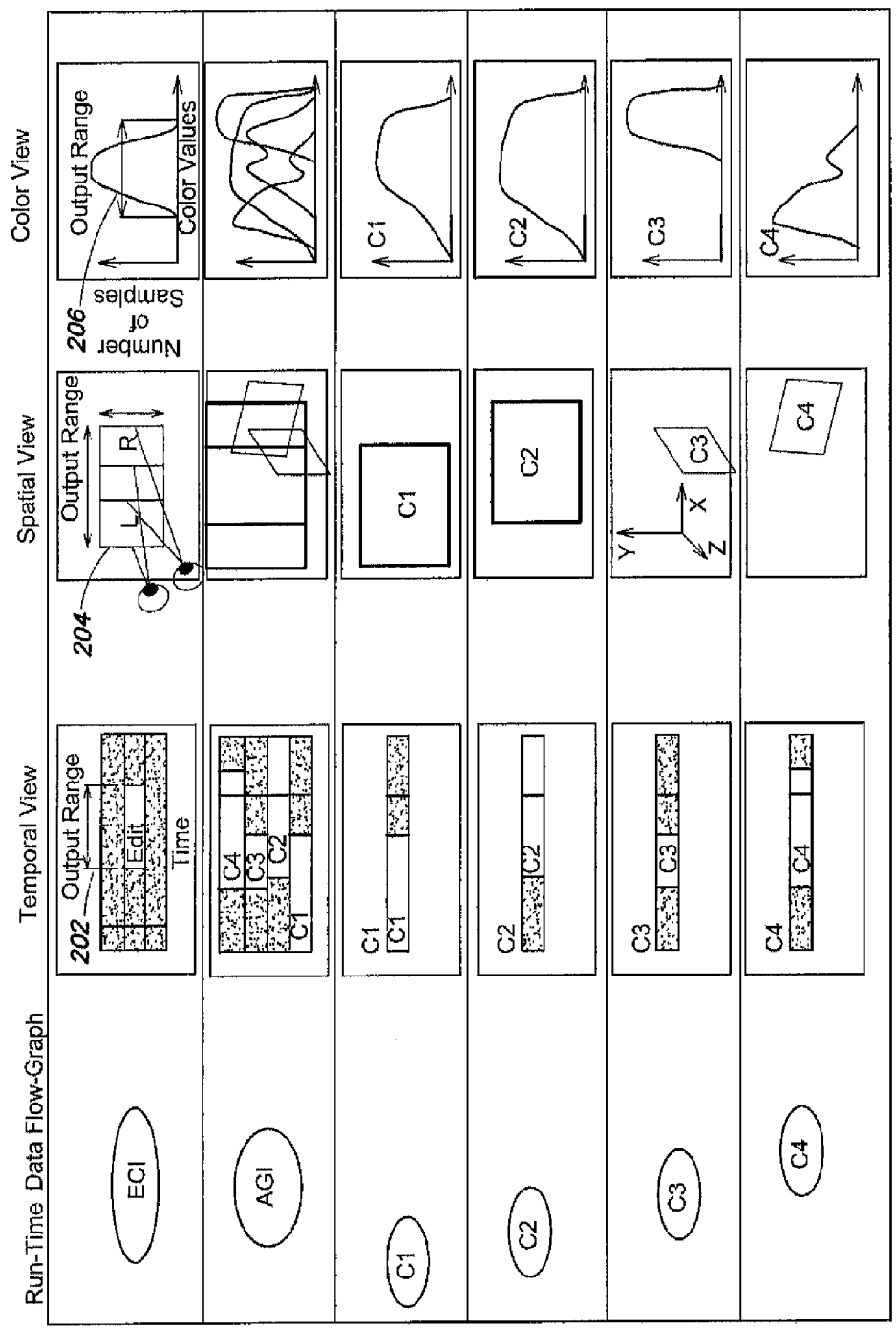
FIG. 2 illustrates user interface elements for displaying and specifying temporal, spatial and color ranges within a synthetic light field source and shows the selected ranges within the perceptual domains at different levels of the composition.

The editing and data management system includes specific UI elements adapted for each type of perceptual data involved. Examples of such UI elements are illustrated in FIG. 2. Timeline representation 202 is provided for the user to specify the temporal range desired from the scene. Graphical bounding boxes 204 in an image viewer are provided to enable the user to manipulate and select spatial ranges within the scene. A histogram 206 displaying the distribution of color values over a floating point range is displayed for selecting a color range. A camera parameter control widget in a parameter editor may be used to set the aperture, shutter speed, focal length and field of view of a virtual camera, which provides an alternative method of defining the spatial and temporal ranges. Other camera parameters may also be received by the editing and data management system to specify other aspects of the synthetic light field source required for the requested output channel(s). While the ranges of the various perceptual data available in the synthetic light field source may be constructed and displayed based solely on the metadata information in the various channels, to reconstruct views such as histogram views, the actual media data may need to be reconstructed. The edit controller receives the user-specified output requirements from the editing and data management system, and converts these requirements into specific range, resolution, and channel requests from the synthetic light field source.

FIG. 2 also illustrates the state of the data at each step of the data pipeline for synthetic light field source editing. The individual input channels show the ranges of data occupied in the temporal, spatial and color domains. The channels' perceptual metadata may be represented in different coordinate systems, but for clarity we show the views of C1, C2, C3, and C4 as transformed by the alignment and grouping module to a common reference coordinate system in temporal, spatial, and color domains. The output ranges defined by the user in the respective perceptual data domains are also shown in FIG. 2.

Figure 3:
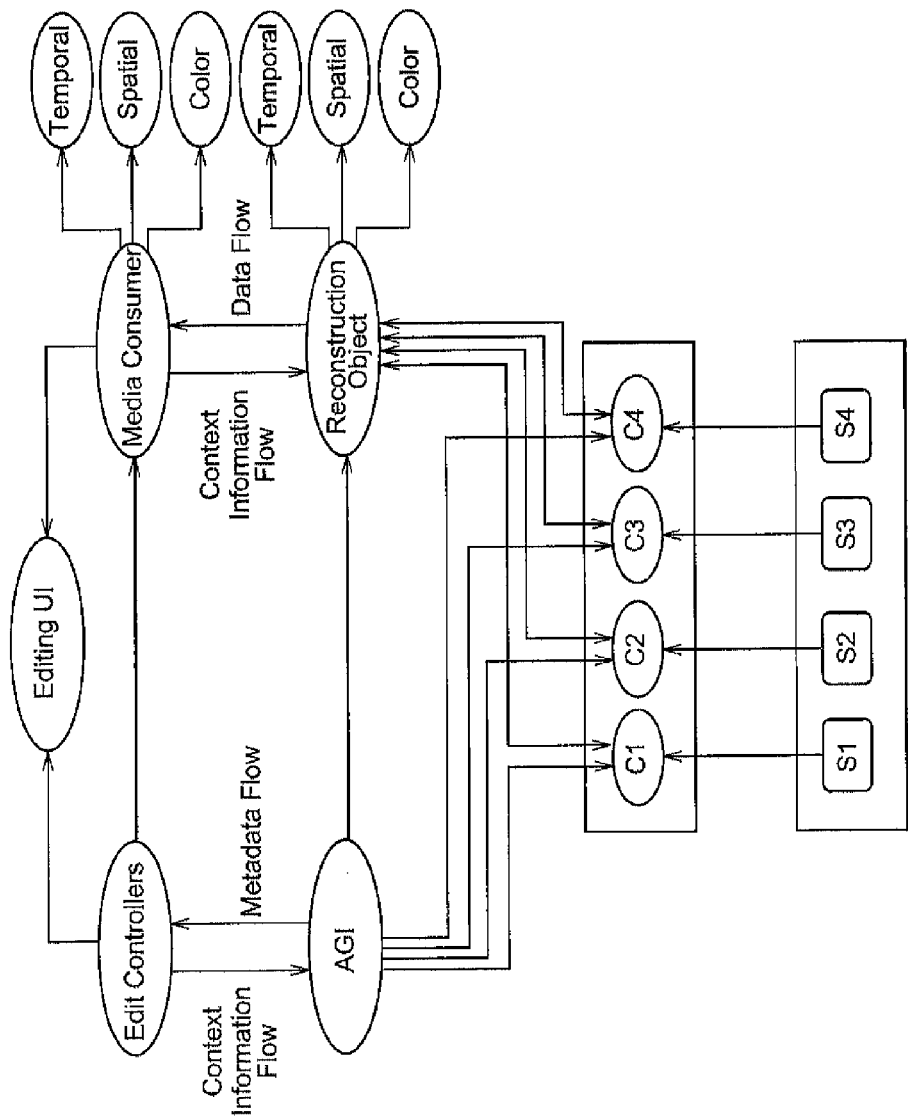
FIG. 3 is a run-time data flow diagram of a multi-channel editing and data management system showing relationships between data objects run-time objects.

FIG. 3 is a run-time data flow diagram for the example shown in FIGS. 1 and 2. In addition to the use of edit controllers and alignment and grouping modules already covered above, other elements include media consumers and reconstruction objects. Based on the editing performed using the editing UI, the output context information is created by the edit controller, used by the media consumers, and passed down to the reconstruction objects. To perform the reconstructions dynamically, the reconstruction objects use the alignment and grouping module to transform the ranges in the requested output context to each channel's individual coordinate system. The reconstructor then passes the transformed request context to each channel. The channels then resolve the data requests to the appropriate offsets in the streams. Once the appropriate data is fetched from each individual stream, the reconstruction objects perform the appropriate filtering between any overlapping data when there are overlaps, attempt to fill in any missing information by interpolating, and/or simply multiplexing the data based on the context information. The reconstruction objects may host plug-ins that are particular to a received perceptual data type, and that are able to reconstruct the output data channels requested by the editors. The reconstructed data is then provided to the requesting media consumer objects, to be displayed in an appropriate user interface such as an image or histogram viewer as shown in FIG. 2.

The example illustrated in FIGS. 1, 2 and 3 illustrates how the editing and data management system treats the various media streams as a single synthetic light field source. Key software components that make this possible are the alignment and grouping module and the reconstructor. As shown in FIG. 2, the ranges occupied by the channels may overlap, thus over-sampling the scene, or the channels may occupy partially (or completely) non-overlapping ranges, allowing information sampled over the scene to be extended to reconstruct novel views in the temporal, spatial and color domains.

Figure 4:
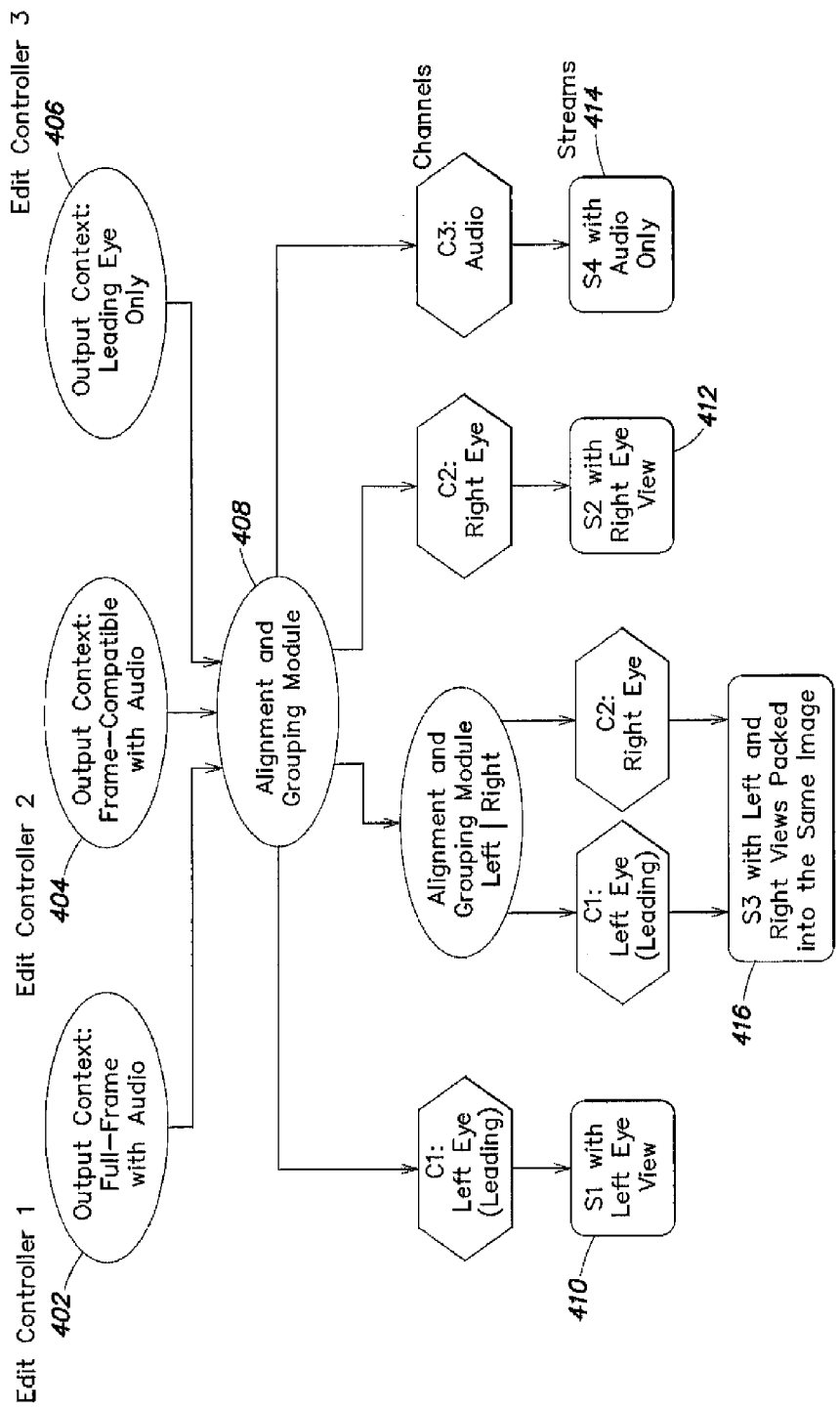
FIG. 4 illustrates the application of a multi-channel editing and data management system to produce output channels used in stereoscopic 3D editing.

FIG. 4 shows how multi-channel editing is used to produce stereoscopic 3D output, in which the input channels correspond to views from two cameras forming a binocular pair, and the associated audio. In this case, the alignment and grouping module and the reconstructor uses simple multiplexing rules to map the output range to the input channels. At the top of the Figure, three edit controllers (402, 404, and 406) impose requirements on alignment and grouping module 408 according to different output contexts. The three instances of the edit controller could also be interpreted as the same controller in three different states. Edit Controller 1 (402) requires the complete video information from the left, right and audio channels, which the alignment and grouping module provides by selecting streams S1 (410), S2 (412), and S4 (414), providing the left view, right view, and audio respectively. The Figure shows how one of the synthetic light field sources is used to provide samples to another one of the synthetic light field sources to augment the range, the resolution, or the perceptual data type of the scene. In this case, stream S3 (416) contains left and right views packed into the same frame, which corresponds to what is required by Edit Controller 2 (404), which therefore requests S3 and S4. Finally, Edit Controller 3 (406) requires only the leading eye view. For this case, the alignment and grouping module selects the contributing channel that has the leading eye label. For example, for left leading eye, the grouper selects only S1 to fulfill the requirements of the output context.

Figure 5:
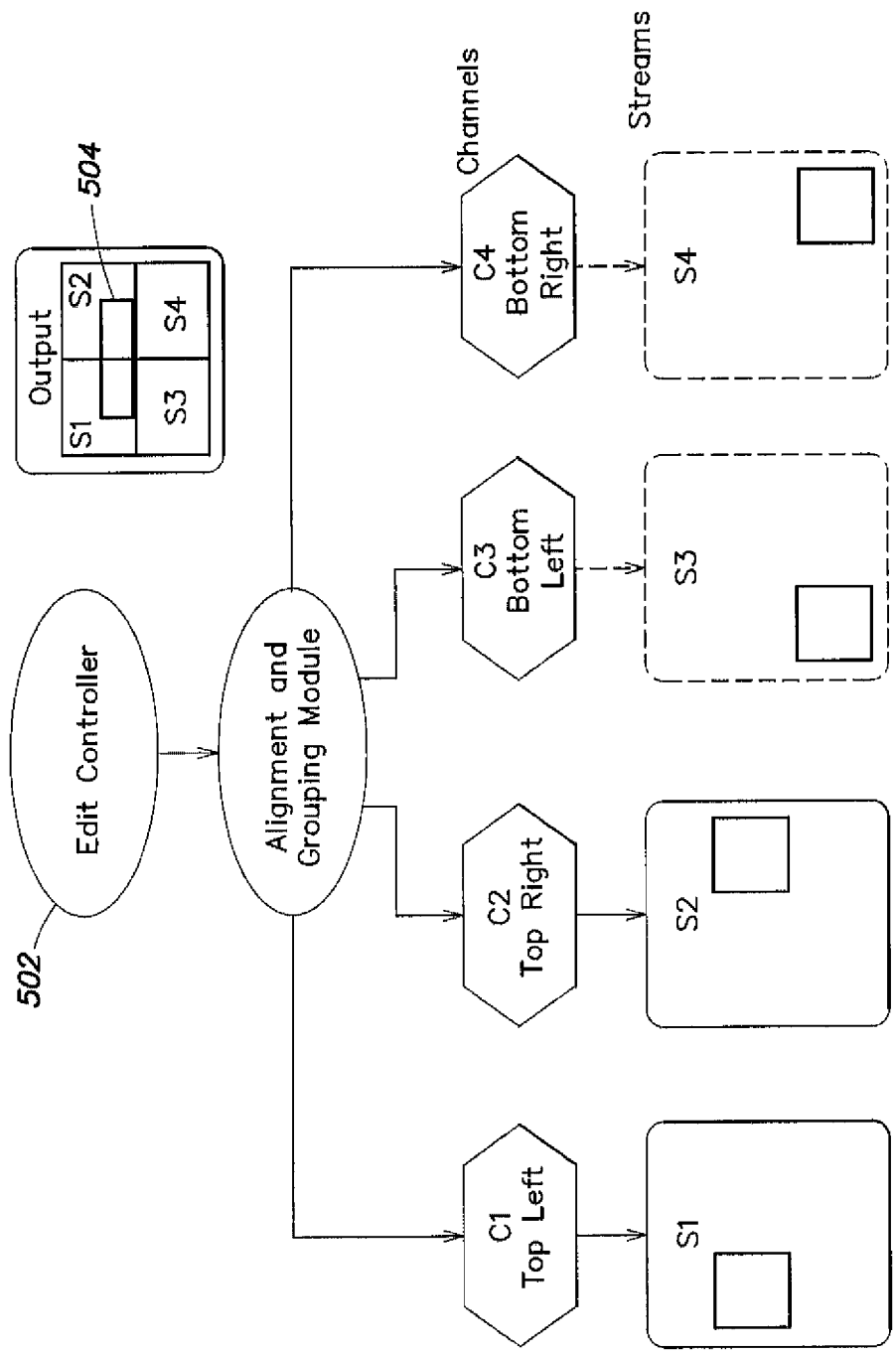
FIG. 5 illustrates the mapping of output requirements onto input streams in a multi-channel editing and data management system, enabling media consolidation and deletion.

FIG. 5 illustrates data management operations, such as the identification and disposal of unused material. Using the same example synthetic light field source illustrated in FIGS. 1-3, the Figure illustrates how the output requirements of edit controller 502 requires only portion 504 of the top half of the overall scene. A consolidate operation could be performed to create new streams containing only the material required to provide the output region. Furthermore, streams of channels that only contribute the bottom left and bottom right part of the scene are not needed to fulfill the requirements of the output context and can be discarded as part of a delete operation to reclaim disk space. In FIG. 5, each of streams S1-S4 corresponds to media data spanning one of four spatial quadrants of the scene. The output requirements draw from a portion of S1 and S2 and do not require S3 and S4. Consolidation may reduce S1 and S2 to the required portion only, and/or discard streams S3 and S4 in their entirety.

The ranges required for the optimized deletion or consolidation of the media illustrated in the example shown in FIG. 5 may be performed without the actual media streams or the run-time elements to reconstruct the media data. The range and relational metadata required for synchronization are stored in the channel information, which may be present even when the media data is not. Once that metadata information is present, the alignment and grouping module may perform intersection tests of the output ranges required with the input ranges that it reads and registers in a common reference coordinate system. Thus for the purposes of analysis and identification of the used and unused ranges, the actual media data is not required. However when the actual consolidation and deletion of unused material is performed, the media objects are required (not shown in FIG. 5).

Figure 6:
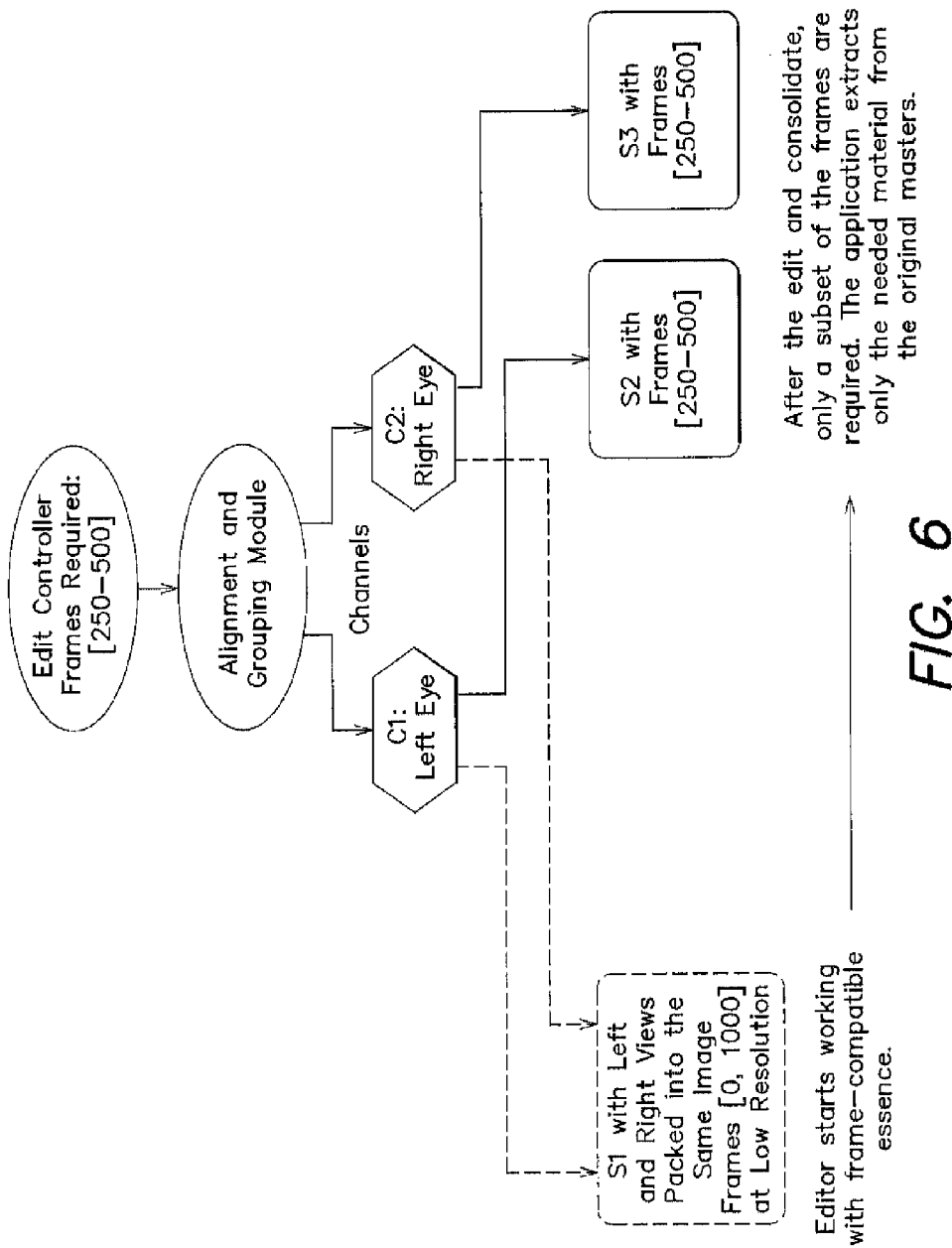
FIG. 6 shows a workflow using a multi-channel editing and data management system in which editing is performed with a first set of media streams, and mastering is performed with a second set of media streams over ranges determined by the editing system.

FIG. 6 demonstrates a workflow in which an editor has two versions of the same channels available in the form of two resolutions. Stream S1 contains a version that is in frame-compatible format (half resolution, with the views from both eyes packed into the same image). S2 and S3 are full resolution versions of the left and right camera views. To save storage space and computation times, a user may start editing with complete spans (frames 0 to 1000 in stream S1) of captured material in a frame-compatible format. To enable this, the edit controller specifies the resolution of the output channel it requires, which in this initial editing case is frame-compatible. After performing the edits using the proxy resolution material, the multi-channel editing and data management system is switched to full-resolution mode. The context from the edit controller is adjusted accordingly for the new resolution. The alignment and grouping module and channel objects match the requested context to the streams with the corresponding resolution (S2 and S3). Furthermore, when a data management consolidate function is performed, the output temporal ranges used in the edit are used as context to extract and keep only the required temporal portions of streams S2 and S3.

The various components of the system described herein may be implemented as a computer program using a general-purpose computer system. Such a computer system typically includes a main unit connected to both an output device that displays information to a user and an input device that receives input from a user. The main unit generally includes a processor connected to a memory system via an interconnection mechanism. The input device and output device also are connected to the processor and memory system via the interconnection mechanism.

One or more output devices may be connected to the computer system. Example output devices include, but are not limited to, liquid crystal displays (LCD), plasma displays, various stereoscopic displays including displays requiring viewer glasses and glasses-free displays, cathode ray tubes, video projection systems and other video output devices, printers, devices for communicating over a low or high bandwidth network, including network interface devices, cable modems, and storage devices such as disk or tape. One or more input devices may be connected to the computer system. Example input devices include, but are not limited to, a keyboard, keypad, track ball, mouse, pen and tablet, touchscreen, camera, communication device, and data input devices. The invention is not limited to the particular input or output devices used in combination with the computer system or to those described herein.

The computer system may be a general purpose computer system which is programmable using a computer programming language, a scripting language or even assembly language. The computer system may also be specially programmed, special purpose hardware. In a general-purpose computer system, the processor is typically a commercially available processor. The general-purpose computer also typically has an operating system, which controls the execution of other computer programs and provides scheduling, debugging, input/output control, accounting, compilation, storage assignment, data management and memory management, and communication control and related services. The computer system may be connected to a local network and/or to a wide area network, such as the Internet. The connected network may transfer to and from the computer system program instructions for execution on the computer, media data such as video data, still image data, or audio data, metadata, review and approval information for a media composition, media annotations, and other data.

A memory system typically includes a computer readable medium. The medium may be volatile or nonvolatile, writeable or nonwriteable, and/or rewriteable or not rewriteable. A memory system typically stores data in binary form. Such data may define an application program to be executed by the microprocessor, or information stored on the disk to be processed by the application program. The invention is not limited to a particular memory system. Time-based media may be stored on and input from magnetic, optical, or solid state drives, which may include an array of local or network attached disks.

A system such as described herein may be implemented in software or hardware or firmware, or a combination of the three. The various elements of the system, either individually or in combination may be implemented as one or more computer program products in which computer program instructions are stored on a non-transitory computer readable medium for execution by a computer, or transferred to a computer system via a connected local area or wide are network. Various steps of a process may be performed by a computer executing such computer program instructions. The computer system may be a multiprocessor computer system or may include multiple computers connected over a computer network. The components described herein may be separate modules of a computer program, or may be separate computer programs, which may be operable on separate computers. The data produced by these components may be stored in a memory system or transmitted between computer systems.

Having now described an example embodiment, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention.

What is claimed is:

1. A method of editing a multi-channel media composition, the method comprising:
    receiving an indication of a plurality of input channels, wherein each input channel of the plurality of input channels includes metadata that explicitly specifies a spatial range and a color range for media data associated with the input channel, wherein media data is captured from a scene, and wherein the metadata is independent of media data captured from the scene;
    using the metadata to align the plurality of input channels with respect to each other within a common spatial coordinate system and a common color space according to the spatial ranges and the color ranges specified by the metadata of each of the plurality of input channels; and
    providing a graphical user interface for a multi-channel media editing system to enable a user of the multi-channel media editing system to specify an output view for the multi-channel media composition by selecting:
        an output spatial range defined in terms of the common spatial coordinate system; and
        an output color range defined in terms of the common color space;
    wherein media data that is captured from the scene and associated with one of the plurality of input channels and that falls within the selected output spatial range and the selected output color range is associated with the output view, wherein the selected output color range spans a portion of the color range for media data associated with at least one of the plurality of input channels.

2. The method of claim 1, wherein at least one of the plurality of channels includes metadata that specifies a temporal range for media data captured from the scene.

3. The method of claim 1, further comprising:
    providing one or more media data streams, each of the one or more media data streams comprising media data representing an input view corresponding to the spatial range and the temporal range specified by metadata of one of the plurality of input channels; and
    associating each of the one or more media data streams to an input channel corresponding to the input view represented by the media data stream.

4. The method of claim 3, wherein the one or more media data streams include media data representing a subset of the output ranges defining the output view, further comprising displaying in a window of the graphical user interface media data from the one or more media data streams.

5. The method of claim 3, wherein the one or more media data streams comprise a plurality of media data streams, wherein a first and a second media data stream of the plurality of media data streams comprise media data at different resolutions, the media data of the first and second media data streams each representing the input view corresponding to the spatial range and the temporal range specified by metadata of a given one of the input channels, and further comprising associating the first and the second media data streams with the given one of the input channels.

6. The method of claim 3, wherein the one or more media data streams includes a first media data stream comprising media data at a first resolution representing the input view corresponding to the spatial range and the temporal range specified by metadata of a given one of the input channels, further comprising:
    enabling the user to view the first media data stream at the first resolution and to define the output view, such that the output view includes at least a portion of the given one of the input channels;
    requesting a second media data stream corresponding to the included portion of the given one of the input channels at a second resolution;
    receiving the second media data stream corresponding to the included portion of the given one of the input channels at the second resolution; and
    associating the given one of the input channels to the second media data stream at the second resolution.

7. The method of claim 6, wherein the first media data stream corresponds to a frame-compatible format of a stereoscopic output view, and the second media data stream corresponds to a full frame version of each of a left eye and a right eye view of the stereoscopic output view.

8. The method of claim 6, wherein the first media data stream corresponds to media data at a first sampling granularity and the second media data stream corresponds to media data at a second sampling granularity.

9. The method of claim 6, wherein the first media data stream corresponds to media data having a first compression type and the second media data stream corresponds to media data having a second compression type.

10. The method of claim 1, wherein the output view is defined in part by an output resolution.

11. The method of claim 3, wherein at least one of the output spatial range and the output color range respectively includes a portion of a spatial range and a color range of an unpopulated input channel of the plurality of input channels, wherein none of the one or more media data streams is associated with the unpopulated channel.

12. The method of claim 11, further comprising:
    receiving media data corresponding to the unpopulated input channel;
    associating the received media data with the unpopulated input channel; and
    enabling the user to view the additional media data in a display of the multi-channel media editing system.

13. The method of claim 1 further comprising:
after enabling a user to specify the output view, receiving an indication of an additional input channel;
aligning the additional input channel with the first mentioned plurality of input channels using metadata included in the additional channel; and
updating the graphical user interface to enable the user to specify the output view having output ranges that include at least one of a spatial range and a color range of the additional input channel.

14. The method of claim 1, further comprising enabling the user to specify the output spatial range using a spatial range user interface feature of the multi-channel media composition system.

15. The method of claim 1, further comprising enabling the user to specify the output color range using a color range user interface feature of the multi-channel media composition system.

16. The method of claim 1, further comprising enabling the user to specify a second output view of the scene.

17. The method of claim 16, wherein the first-mentioned output view and the second output view correspond to a left eye view and right eye view respectively of a stereoscopic output view of the scene.

18. The method of claim 17, wherein the multi-channel media composition system includes a display window for displaying a representation of a current state of the multichannel media composition, and wherein the multichannel media composition system enables the user to view a selected one of the left eye view and the right eye view in the display window.

19. The method of claim 16, wherein at least one of the first-mentioned output view and the second output view includes a view constructed from a plurality of the input channels.

20. The method of claim 1, further comprising receiving an indication of one or more additional input channels representing additional media streams that are not to be aligned.

21. The method of claim 20, wherein the additional media streams include at least one of ancillary data, an audio mask, and a matte.

22. The method of claim 3, further comprising:
determining a set of input channel ranges that are required to generate the output view; and
consolidating one or more of the media data streams to retain portions of the media data streams corresponding to the set of required input channel ranges thereby enabling portions of the media data streams not corresponding to the set of required ranges of values to be deleted.

23. The method of claim 1, wherein the multi-channel media composition is a video composition.

24. The method of claim 1, wherein the multi-channel media composition is a still image composition.

25. The method of claim 1, wherein the multi-channel media composition is a light field image.

26. The method of claim 1, wherein the multi-channel media composition comprises computer generated media.

27. A computer program product comprising:
a non-transitory computer-readable medium with computer program instructions encoded thereon, wherein the computer program instructions, when processed by a computer, instruct the computer to perform a method for multi-channel media composition, the method comprising:
receiving an indication of a plurality of input channels, wherein each input channel of the plurality of input channels includes metadata that explicitly specifies a spatial range and a color range for media data associated with the input channel, wherein media data is captured from a scene, and wherein the metadata is independent of media data captured from the scene;
using the metadata to align the plurality of input channels with respect to each other within a common spatial coordinate system and a common color space according to the spatial ranges and the color ranges specified by the metadata of each of the plurality of input channels; and
providing a graphical user interface for a multi-channel media editing system to enable a user of the multi-channel media editing system to specify an output view for the multi-channel media composition by selecting:
an output spatial range defined in terms of the common spatial coordinate system; and
an output color range defined in terms of the common color space;
wherein media data that is captured from the scene and associated with one of the plurality of input channels and that falls within the selected output spatial range and the selected output color range is associated with the output view, wherein the selected output color range spans a portion of the color range for media data associated with at least one of the plurality of input channels.

28. A computer system for multi-channel media composition, the computer system comprising:
a processor programmed to:
receive an indication of a plurality of input channels, wherein each input channel of the plurality of input channels includes metadata that explicitly specifies a spatial range and a color range for media data associated with the input channel, wherein media data is captured from a scene, and wherein the metadata is independent of media data captured from the scene;
use the metadata to and align the plurality of input channels with respect to each other within a common spatial coordinate system and a common color space according to the spatial ranges and the color ranges specified by the metadata of each of the plurality of input channels; and
provide a graphical user interface for a multi-channel media editing system to enable a user of the multi-channel media editing system to specify an output view for the multi-channel media composition by selecting:
an output spatial range defined in terms of the common spatial coordinate system; and
an output color range defined in terms of the common color space;
wherein media data that is captured from the scene and associated with one of the plurality of input channels and that falls within the selected output spatial range and the selected output color range is associated with the output view, wherein the selected output color range spans a portion of the color range for media data associated with at least one of the plurality of input channels.

* * * * *